(12) United States Patent
Aquarius

(10) Patent No.: US 7,788,886 B2
(45) Date of Patent: Sep. 7, 2010

(54) APPARATUS AND METHOD FOR LOADING CONTAINERS WITH BAGS

(75) Inventor: Pieter Theodorus Johannes Aquarius, Stramproy (NL)

(73) Assignee: PI-WI Beheer B.V., Stramproy (NL)

( * ) Notice: Subject to any disclaimer, the term of this patent is extended or adjusted under 35 U.S.C. 154(b) by 324 days.

(21) Appl. No.: 10/810,349

(22) Filed: Mar. 26, 2004

(65) Prior Publication Data

US 2005/0034961 A1 Feb. 17, 2005

(30) Foreign Application Priority Data

Mar. 28, 2003 (NL) .................................. 1023046

(51) Int. Cl.
*B65G 47/26* (2006.01)

(52) U.S. Cl. .............................. 53/502; 53/540; 53/537; 53/247; 53/244; 53/248; 53/250; 53/251; 53/443; 53/447; 53/448; 198/411

(58) Field of Classification Search .................. 53/540, 53/537, 247, 244, 248, 250, 251, 502, 443, 53/447, 448; 198/411, 415

See application file for complete search history.

(56) References Cited

U.S. PATENT DOCUMENTS

| | | | | |
|---|---|---|---|---|
| 4,250,690 | A * | 2/1981 | Lorenzen et al. ............... | 53/475 |
| 4,608,808 | A * | 9/1986 | Ryan et al. ..................... | 53/436 |
| 4,781,011 | A * | 11/1988 | Prakken ........................ | 53/537 |
| 4,800,703 | A | 1/1989 | Goodman | |
| 4,805,379 | A * | 2/1989 | Leibetseder et al. ............ | 53/444 |
| 4,864,801 | A | 9/1989 | Fallas | |
| 4,984,677 | A * | 1/1991 | Prakken .................... | 198/418.6 |
| 5,022,218 | A * | 6/1991 | Prakken ........................ | 53/529 |
| 5,123,231 | A | 6/1992 | Fallas et al. | |
| 5,279,099 | A * | 1/1994 | Goodman et al. ............... | 53/53 |
| 5,313,766 | A * | 5/1994 | Rimondi et al. ................ | 53/451 |
| 5,430,994 | A * | 7/1995 | Focke et al. .................... | 53/493 |

(Continued)

FOREIGN PATENT DOCUMENTS

EP 0 606 495 7/1994

(Continued)

*Primary Examiner*—Rinaldi I. Rada
*Assistant Examiner*—Michelle Lopez
(74) *Attorney, Agent, or Firm*—Weingarten, Schurgin, Gagnebin & Lebovici LLP

(57) ABSTRACT

An apparatus for loading containers with bags, wherein the apparatus is provided with a feed conveyor assembly, a loading unit, and a control designed for, each time, forming a layer of bags in the loading unit, which layer has dimensions substantially corresponding to the bottom dimensions of a container to be filled, and wherein the control is designed such that, each time, the loading unit places a wholly formed layer in the container to be filled. In the method, the bags are oriented in a feed conveyor assembly and placed from the feed conveyor assembly onto a bottom of a holder of a loading unit, wherein, subsequently, when the whole bottom of the holder of the loading unit has been filled with bags, this holder is lowered into a container to be filled and the bottom is released when the bottom of the holder is just above the bottom of the container to be filled or a layer of bags present in this container.

16 Claims, 18 Drawing Sheets

U.S. PATENT DOCUMENTS

| | | | |
|---|---|---|---|
| 5,457,942 A | * | 10/1995 | Mantovani .................. 53/463 |
| 5,495,932 A | * | 3/1996 | Dyess ..................... 198/464.1 |
| 5,715,660 A | * | 2/1998 | Balentine ..................... 53/501 |
| 5,778,640 A | | 7/1998 | Hendry et al. |

FOREIGN PATENT DOCUMENTS

| | | |
|---|---|---|
| EP | 0 662 421 | 7/1995 |
| EP | 0 806 361 | 11/1997 |
| EP | 0 806 3561 | 11/1997 |
| GB | 2 066 201 | 7/1981 |
| GB | 2 224 986 | 5/1990 |
| JP | 08 258803 | 10/1996 |
| NL | 8800444 | 9/1989 |

* cited by examiner

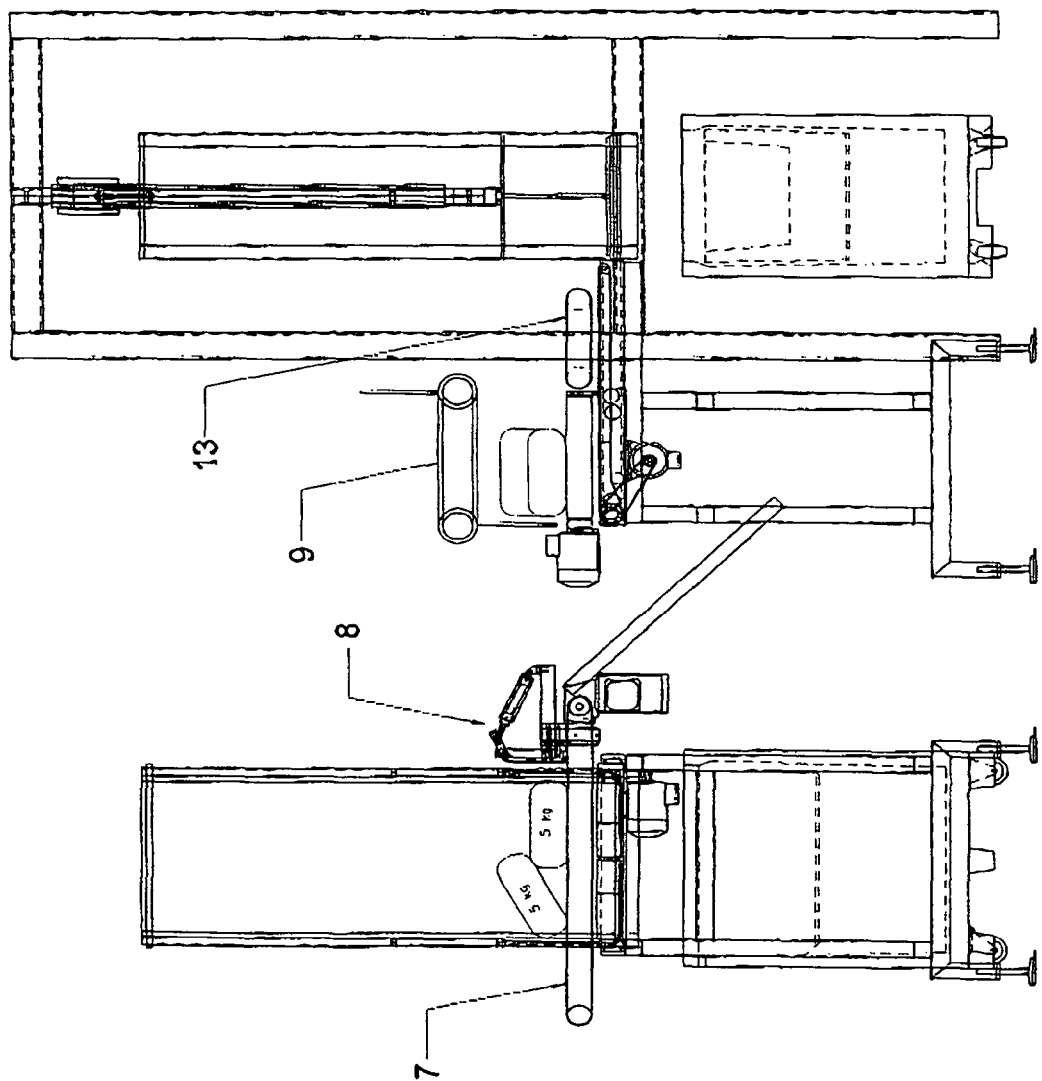

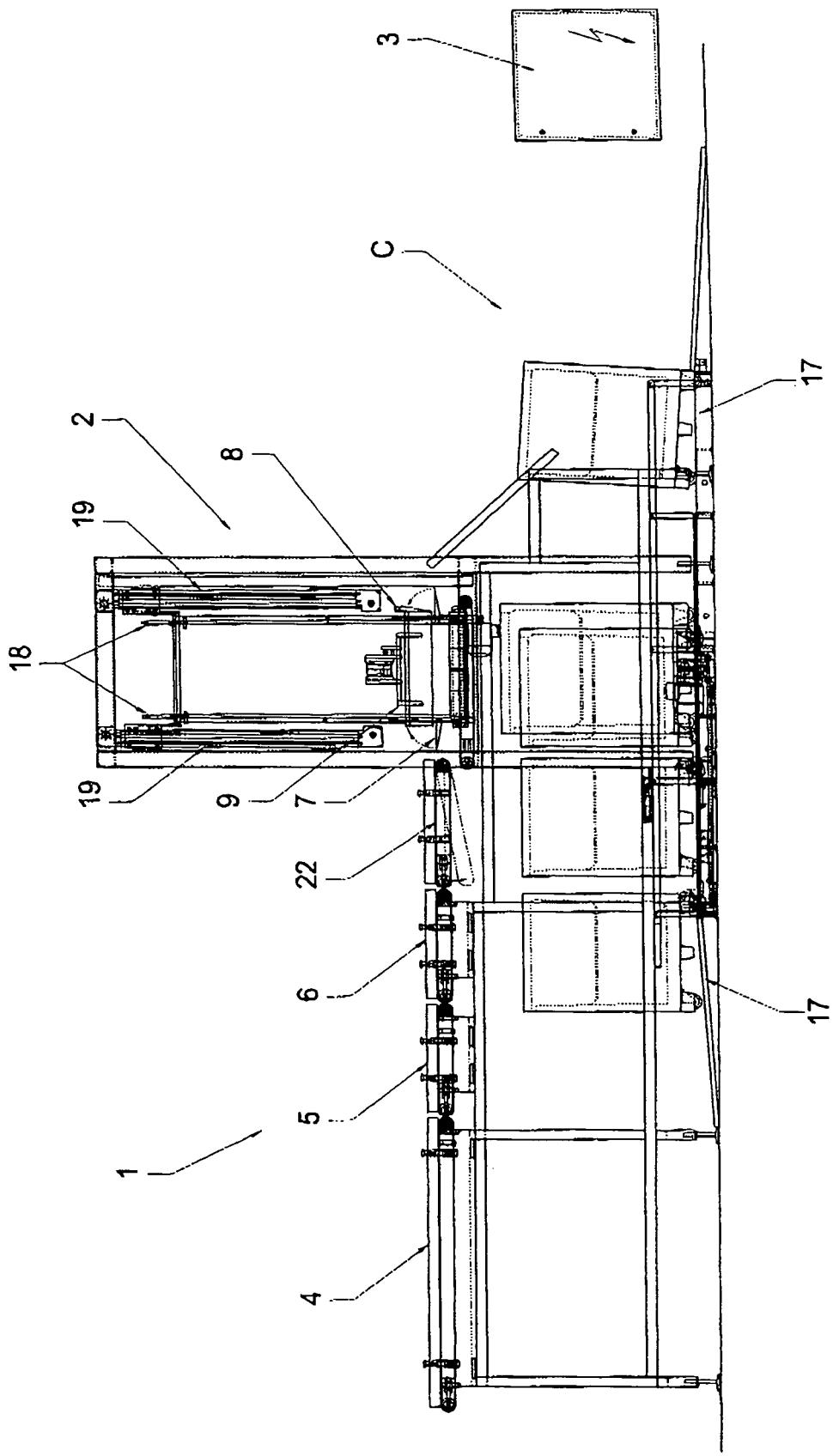

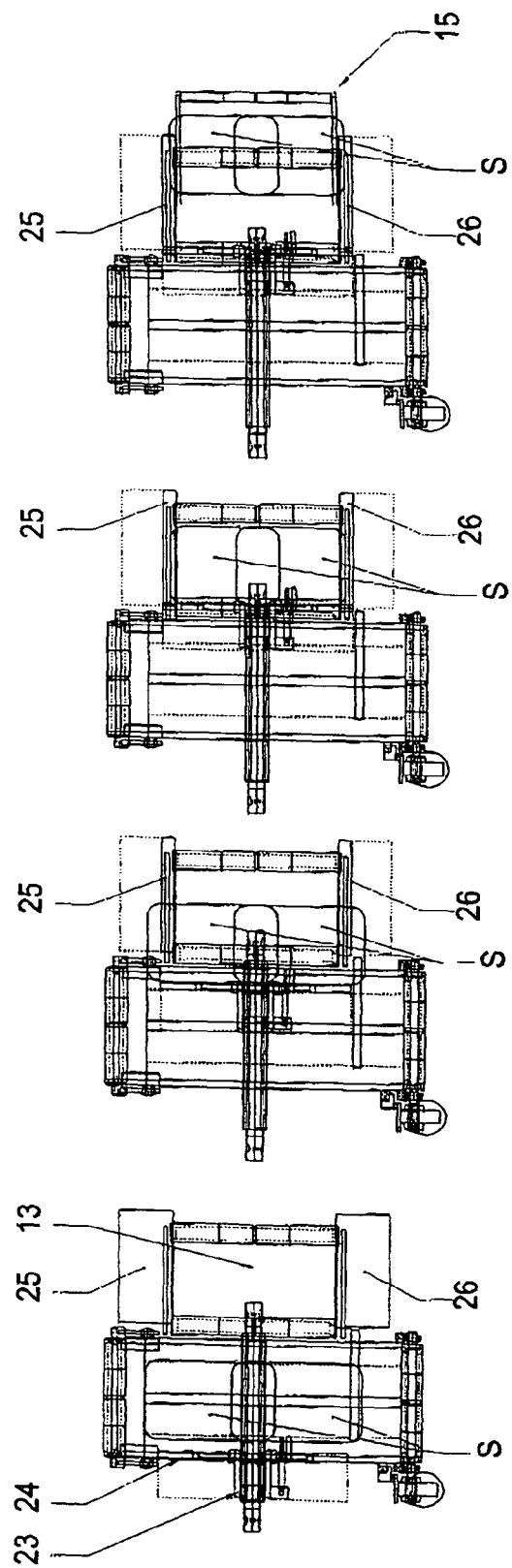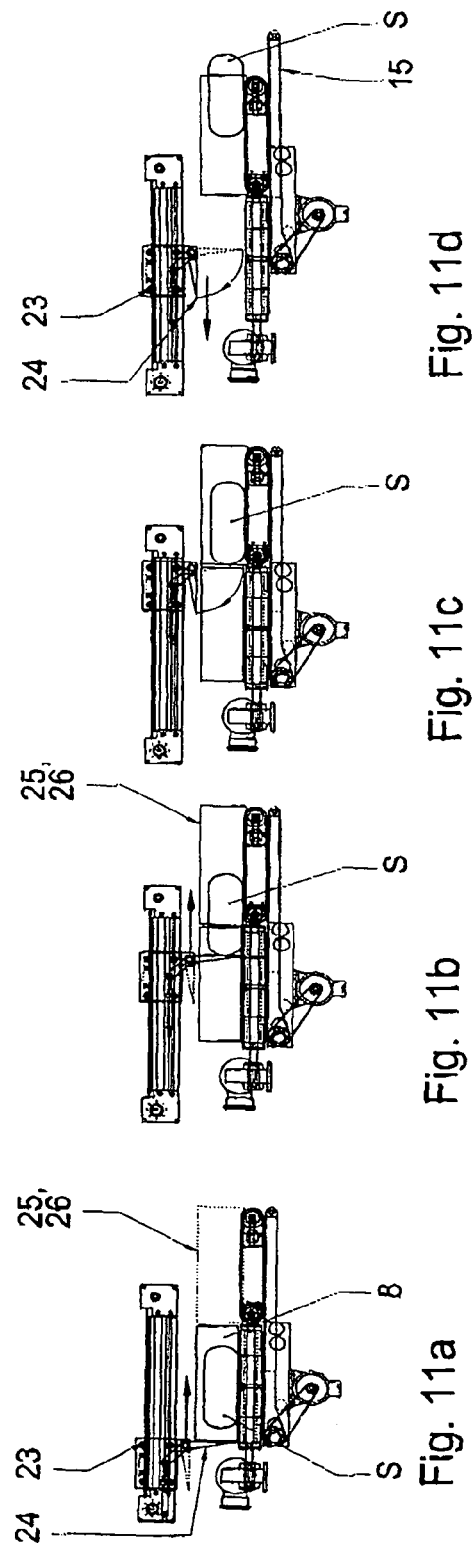

APPARATUS AND METHOD FOR LOADING CONTAINERS WITH BAGS

This application claims priority to a Dutch application No. NL 1023046 filed Mar. 28, 2003.

The invention relates to an apparatus for loading containers with bags, such as for instance bags or netting packages of fruit or bags of potatoes and other sensitive products, where the apparatus is provided with a feed conveyor assembly and a loading unit.

The invention also relates to a method for loading containers with bags.

Up to now, applicant has put apparatuses in circulation in which, each time, one bag, or multiple bags, are picked up from the feed conveyor assembly by a robot and are placed in a container. Since the apparatuses are used for processing bags of potatoes, apples and the like, the apparatus needs to be suitable for processing bags having a weight of up to approximately 25 kg. With the increasingly high processing capacity desired in the market, placing bags in a container by means of a robot can no longer be realized at a reasonable cost price. With the high movement speed needed to reach the desired processing capacity, the construction of the robot needs to be so rigid that the robot becomes heavy and thus the drives of this robot also become heavy. This results in a considerable cost increase of the robot, which makes the apparatus virtually unsaleable for larger processing capacities.

The invention therefore contemplates an apparatus for loading containers with bags which can be manufactured against a reasonable cost price and where the bags are still carefully and skillfully placed in the container, so that damage of the products present in the bags is prevented. For this purpose, the apparatus of the type described in the opening paragraph is characterized in that it is provided with a control designed for, each time, forming a layer of bags in the loading unit, which layer has dimensions substantially corresponding to the bottom dimensions of a container to be filled, and where the control is designed such that, each time, the loading unit places a formed layer in the container to be filled.

The method provided by the invention is characterized in that, from a feed conveyor assembly, the bags are placed onto a bottom of a holder of a loading unit, while subsequently, when the whole bottom of the holder of the loading unit has been filled with bags, this holder is lowered into a container to be filled and the bottom is released when the bottom of the holder is just above the bottom of the container to be filled or a layer of bags present in this container.

Herein, a container is understood to mean a crate, box or similar container.

Because, from the different bags, first, a layer of bags is formed at a fixed position and only then the whole layer is introduced into the container and there released at the desired level, this eliminates the necessity of the fast working robot which needs to have a larger freedom of movement in order to, each time, place bags in a desired position in the container. The whole feed conveyor assembly can be built up from relatively simple and therefore inexpensive belt/chain conveyors, which is considerably less expensive than the fast working, rigid robots needed according to the state of the art. A layer having substantially the same dimensions as the bottom dimensions of a container to be filled is also understood to mean a layer whose dimensions are slightly larger than the bottom dimensions of the container. By such a layer with slightly larger dimensions, a very good fill factor of the container to be filled is achieved.

According to a further elaboration of the invention, it is particularly favorable when the feed conveyor assembly comprises two rotating systems arranged one behind the other, each rotating system comprising two parallel running conveyor belts drivable at different speeds.

When a layer of bags is formed, the two rotating systems arranged one behind the other can be used to rotate a bag through 90 degrees. Here, according to a further elaboration of the invention, it is particularly favorable when the control is designed to rotate a bag through an angle of substantially 45 degrees on the first rotating system and to rotate it through an additional angle of substantially 45 degrees on the second rotating system, the control further being designed to already provide the first rotating system, during the processing of a preceding bag on the second system, with control signals for processing a following bag on the first rotating system. In this manner, the bags can be conveyed at a small distance from one another, one behind the other, so that a larger processing capacity is possible and is not limited by the time needed to rotate a bag on a single rotating system.

For further elaborations of the feed conveyor assembly, reference is made to the subclaims and the following description of the drawings of an exemplary embodiment of the invention.

According to a further elaboration of the invention, the loading unit is characterized in that it is provided with a holder which is movable up and down, having such outer dimensions that it is substantially fittingly receivable in a container to be loaded. Because of this, a layer formed in the holder of the loading units fills the bottom of the container to be filled in one go.

It goes without saying that the holder needs to possess special properties to allow a layer of bags to be formed therein in an efficient manner and, in addition, to allow this layer of bags to be placed as a whole in a container without damaging the products. According to a further elaboration of the invention, for this purpose, the holder is provided with an open side via which the holder is loadable from the further conveying path, while the bottom of the holder is formed by a flexible curtain which can be pulled away from the bottom. Because the side of the holder is open, bags can be placed onto the bottom of the holder without needing to cover any significant height difference. Once placed in the holder, the bags can then be lowered, together with the holder, into the container, after which the bottom of the holder can be removed by pulling "open" the flexible curtain, so that the bottom of the holder is released.

According to a further elaboration of the invention, the flexible curtain may comprise two curtain parts which are movable from a closed position from the middle of the bottom away from each other for removing the bottom, such that a layer of bags can be released from the middle of the holder. Such a bottom provided with two curtain parts can be opened twice as fast as a bottom provided with a single curtain because only half the path length needs to be covered.

In order to limit the drop height of the bags to a minimum, the holder may be provided with a sensor designed for observing a certain distance from the bottom of the holder to the bottom of the container or a top side of bags already present in this container. The sensor may be a mechanical sensor, such as for instance a proximity switch.

In order to bring about an accurate control of the vertical movement of the holder without this necessitating heavy, expensive motors, it is favorable according to a further elaboration of the invention when the holder is partly carried by at least one pressure-controlled air cylinder and is partly carried by a drive by means of which the vertical position of the holder is controllable.

Further elaborations of the invention are described in the subclaims and will hereinafter be further clarified on the basis of an exemplary embodiment, with reference to the drawing, in which:

FIGS. 5a-5j show a similar view to that shown in FIG. 3 in the different stages of placing bags in a container;

FIGS. 6a-6e and 6g show left side elevational views of FIGS. 5a-5e and 5g in corresponding stages of placing bags in a container;

FIG. 7 shows a similar view to that shown in FIG. 1 of a second exemplary embodiment;

Figure 10:
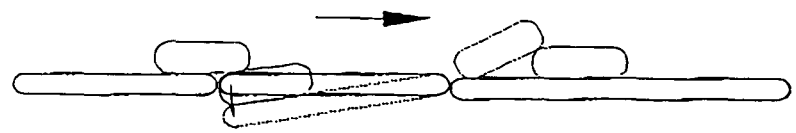
Figure 14A:
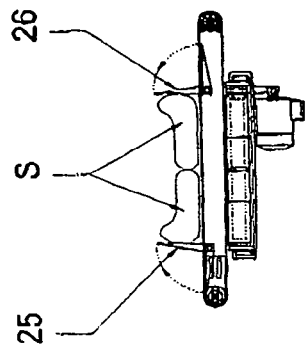
Figure 14B:
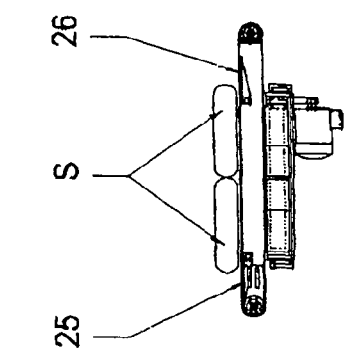
Figure 13:
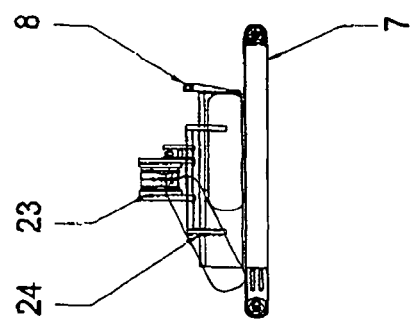
Figure 15C:
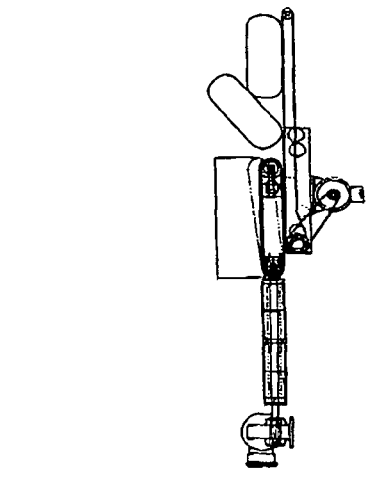
Figure 15B:
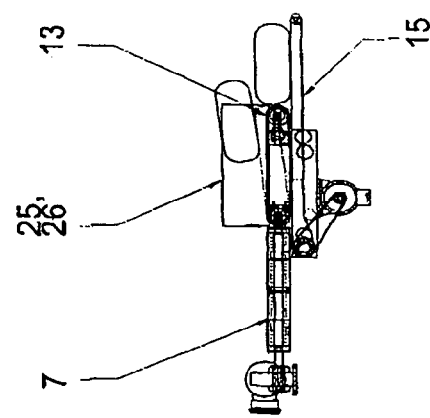
Figure 15A:
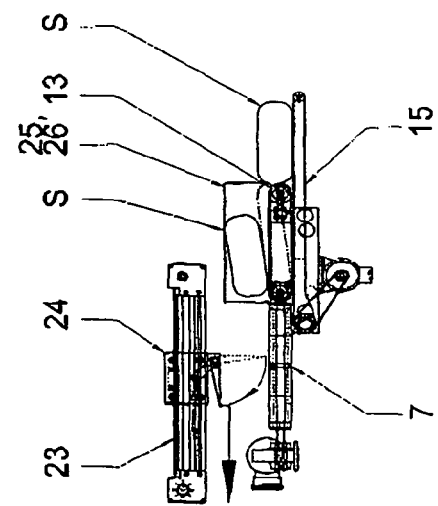
Figure 16D:
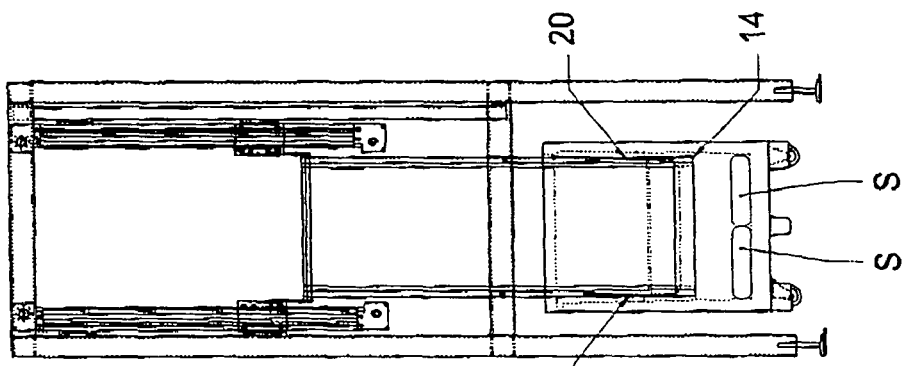
Figure 16C:
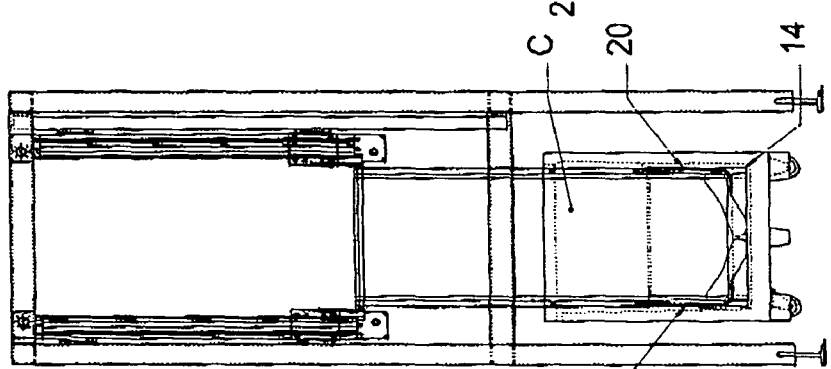
Figure 16B:
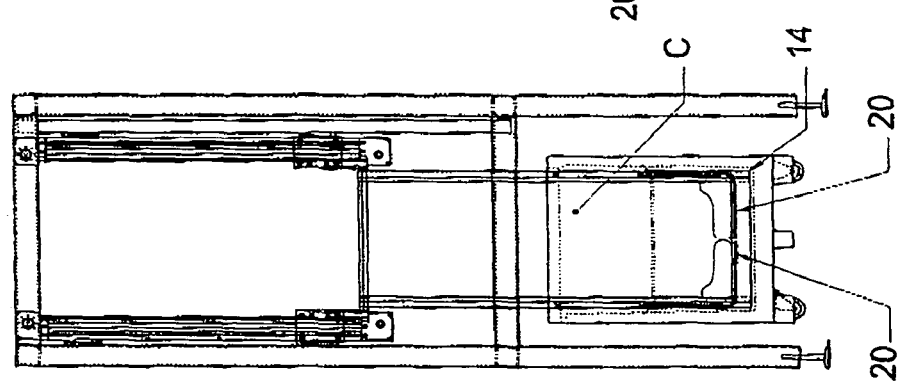
Figure 16A:
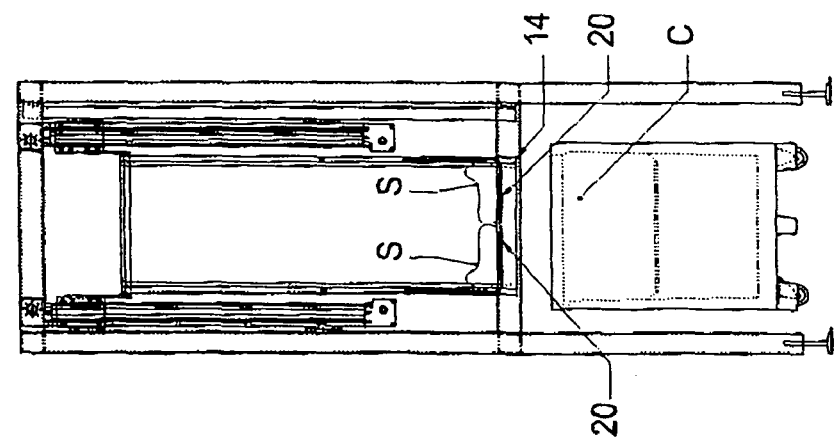

FIG. 10 diagrammatically shows the manner in which, in the feed conveying path, the bags can be placed on top of one another in an overlapping manner;

FIGS. 11a-11d show, in side elevational view, the moving of the bags to the loading unit;

FIGS. 12a-12d show, in top plan view, in steps corresponding to FIGS. 11a-11d, the moving of the bags to the loading unit;

FIG. 13 shows a left side elevational view of FIG. 11a;

FIGS. 14a-14b show the folding of side plates connected to the collecting belt;

FIGS. 15a-15c show how, during the moving of the bags to the loading unit, these bags can be placed on top of one another in an overlapping manner; and FIGS. 16a-16d show the placing of a layer of bags from the holder of the loading unit into a container.

Figure 1:
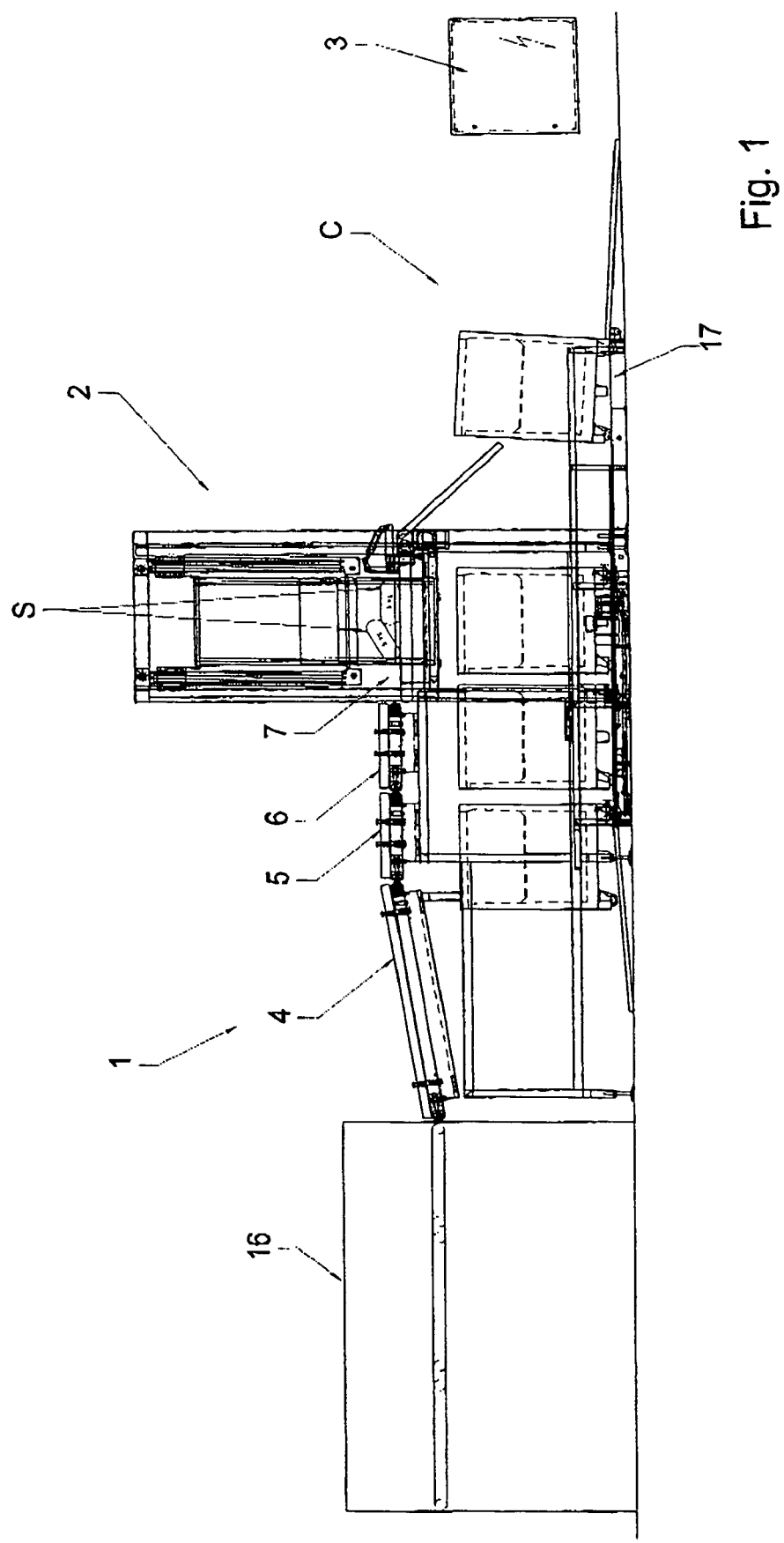
FIG. 1 shows a side elevational view of an exemplary embodiment of the apparatus.
Figure 2:
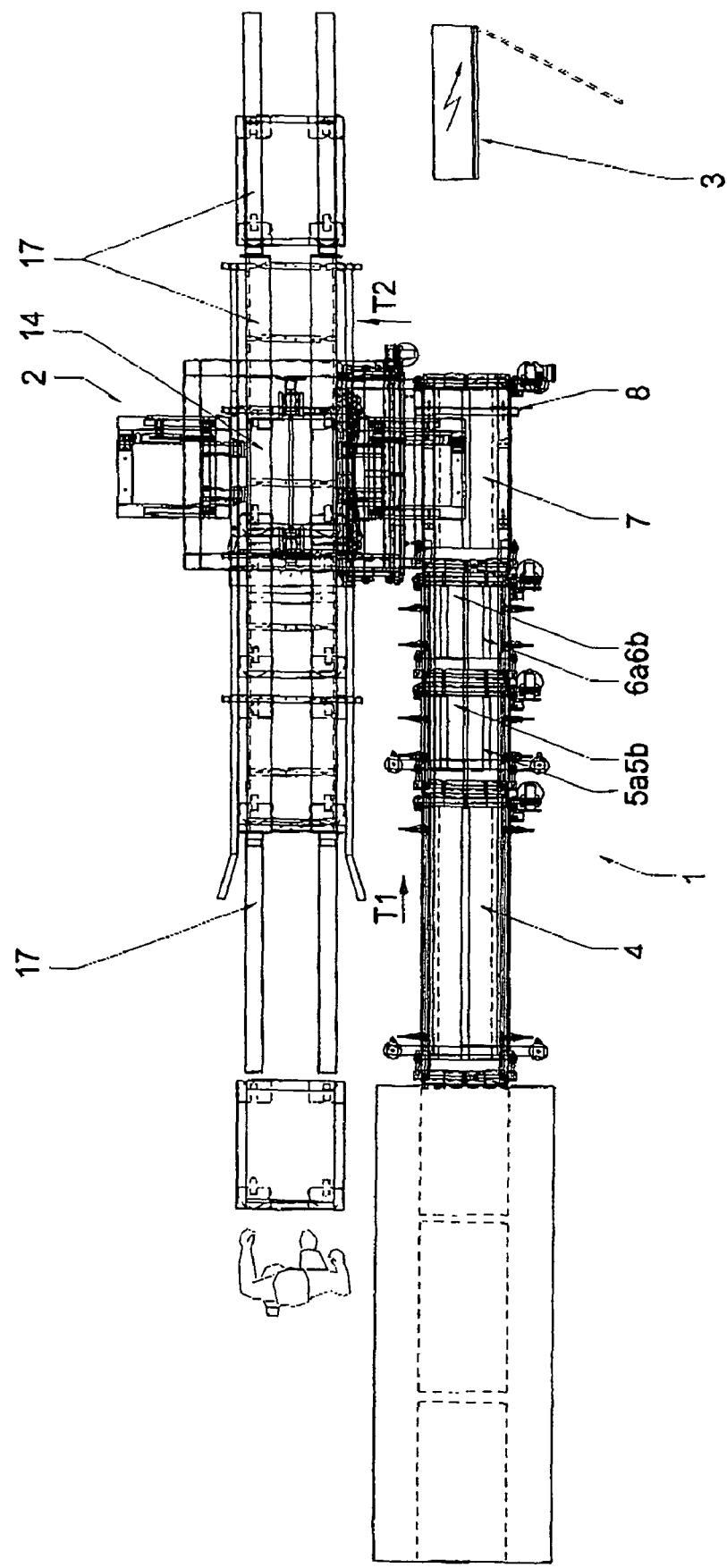
FIG. 2 shows a top plan view of the apparatus shown in FIG. 1.
Figure 4:
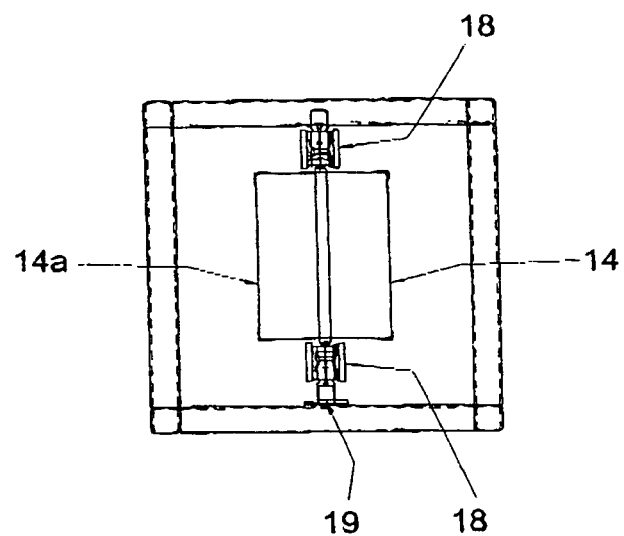
FIG. 4 shows a top plan view of the loading unit of the apparatus shown in FIGS. 1-3.
Figure 3:
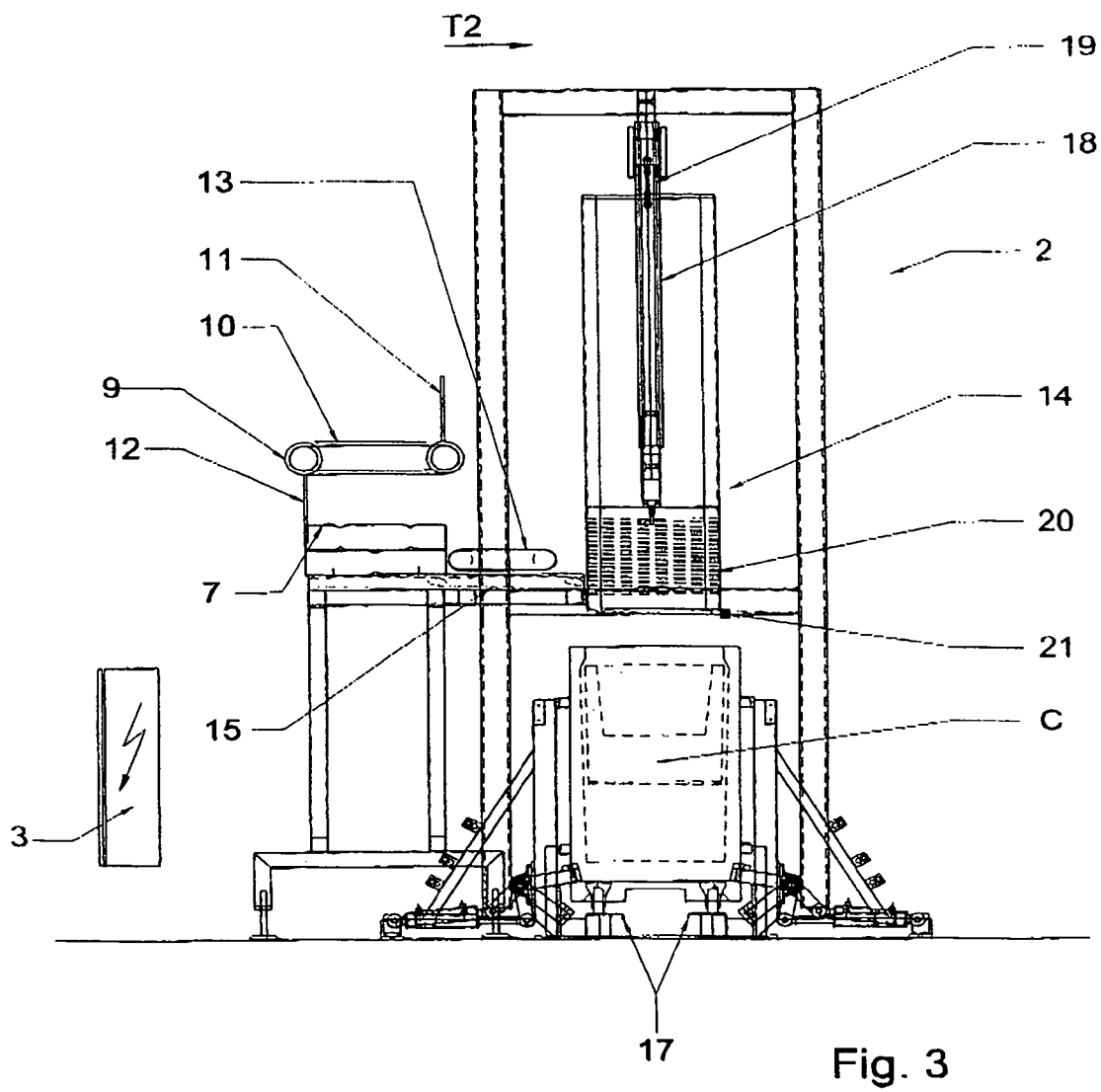
FIG. 3 shows a right side elevational view of the apparatus shown in FIG. 1.

FIGS. 1-6 show a first embodiment for loading containers C with bags S. The bags or netting packages S may, for instance, contain fruit, potatoes or other sensitive products. However, other products, such as for instance flour, beans, washing powder or the like are also possible. The apparatus is provided with a feed conveyor assembly 1 and a loading unit 2. Further, a control 3 is provided which controls the different drives of the apparatus. The feed conveyor assembly comprises a first conveyor belt 4 and two rotating systems 5, 6 arranged one behind the other. In a top plan view which is shown in FIG. 2, it is visible that each rotating system 5, 6 is provided with two parallel running conveyor belts 5a, 5b and 6a, 6b, respectively. Downstream of the second rotating system 6, a second belt conveyor 7 is present by means of which the bags S are movable against a stop 8. Viewed in the first conveying direction of the first conveyor belt 4 and the second conveyor belt 7, upstream of the stop 8, a transfer device 9 is present by means of which the bags can be moved in a second conveying direction, extending perpendicular to the first conveying direction, to the loading unit 2. The transfer device 9 is clearly visible in FIG. 3 and is, in the present exemplary embodiment, designed as a conveyor chain 10 provided with two carriers 11, 12. The transfer device 9 is arranged above the second belt conveyor 7. Viewed in the second conveying direction T2 of the transfer device 9, downstream of the transfer device 9, a collecting belt 13 is arranged, which collecting belt 13 is located between the second conveyor belt 7 and the loading unit 2, more in particular the holder 14 thereof. Below the collecting belt 13, a retracting belt 15 extends, which retracting belt 15 comprises a conveyor belt which is movable as a whole in horizontal direction, such that a discharge end thereof is movable into and out of the holder 14. The collecting belt 13 and the retracting belt 15 are part of the further conveying path indicated in the claims.

The holder 14 of the loading unit 2 is arranged so as to be movable up and down. For this purpose, the holder is suspended from at least one pressure-controlled air cylinder 18. This cylinder can carry the weight of the holder 14 and the product present in the container for, for instance, 99 percent. Further, a drive 19 is present by means of which the vertical position of the holder is controlled. In the present exemplary embodiment, the pressure-controlled air cylinder 18 is switched on in the downward path when the holder 14 has been filled with a layer of bags. In the upward path, the holder 14 is wholly carried by the drive 19 and the pressure-controlled air cylinder 18 is switched off.

Because the weight of the holder with the layer of bags present therein is, in the downward path, largely carried by the pressure-controlled air cylinder 18, the scanning of the products already present in the container is carried out very accurately and product-friendly. In addition, the accuracy with which the holder can be positioned is more adequately guaranteed. The holder 14 has such outer dimensions that it is substantially fittingly receivable in a container C to be loaded. This allows the whole bottom surface of a container C to be filled with a layer of bags S in one loading operation. The holder 14 is provided with an open side 14a via which the holder 14 is loadable from the further conveying path. The bottom of the holder 14 is formed by a flexible curtain 20 which can be pulled away from the bottom in order to release bags S present in the holder 14. At the bottom side, the holder 14 may be provided with a sensor 21 designed for observing a certain distance from the bottom of the holder 14 to the bottom of the container C or a top side of the bags S already present in this container C. The sensor may, for instance, be a mechanical sensor such as a proximity switch. It is also possible that it is observed by means of the drive 19 that the load decreases, which indicates that a part of the weight of the holder is carried by the container bottom or bags present therein and that, therefore, the holder 14 is at the desired level.

Upstream of the first belt conveyor 4, a conveying assembly 16 is present in which, for instance, metal detection and weight measurement can take place. Further, in FIGS. 1-3, a feed and discharge system 17 for feeding and discharging containers C is clearly visible. In the present exemplary embodiment, the feed and discharge system 17 is designed as a rail system over which carts containing the containers C are mobile.

Figure 5B:
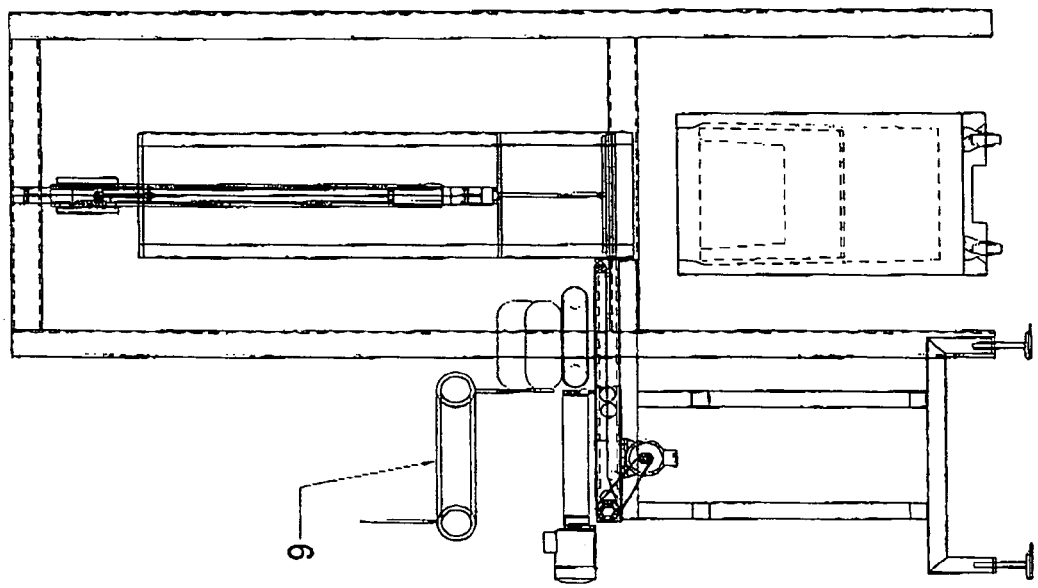
Figure 6B:
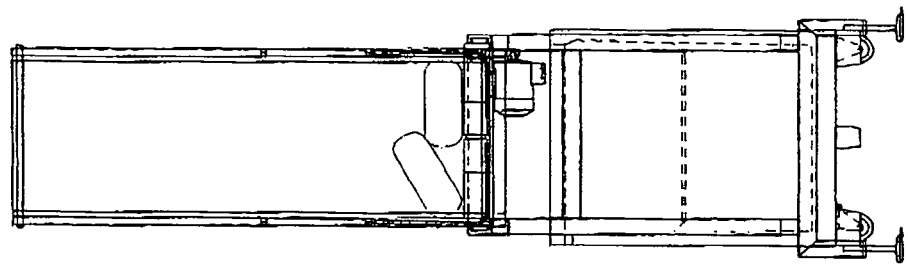
Figure 5C:
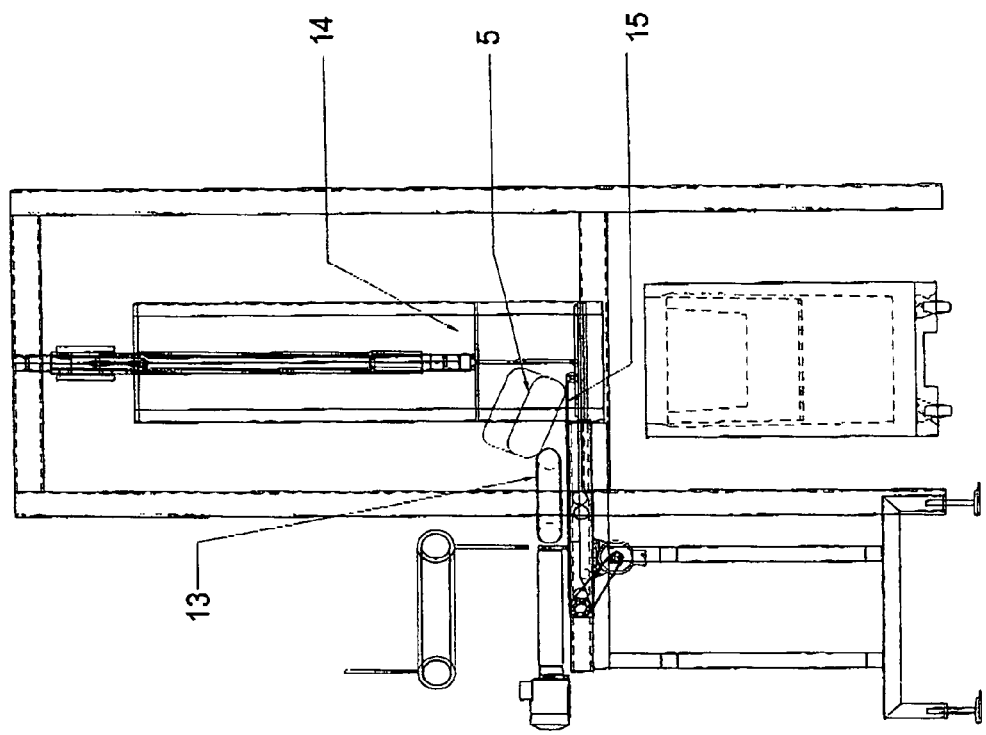
Figure 6C:
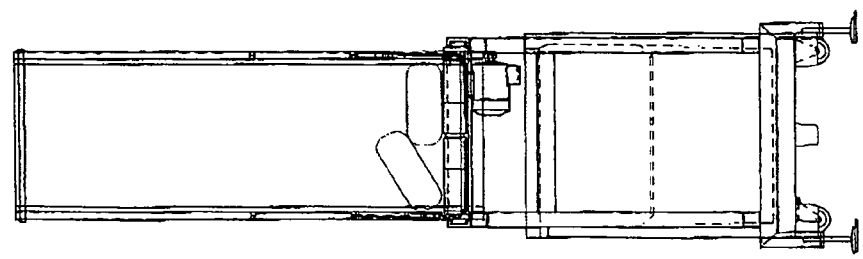
Figure 5D:
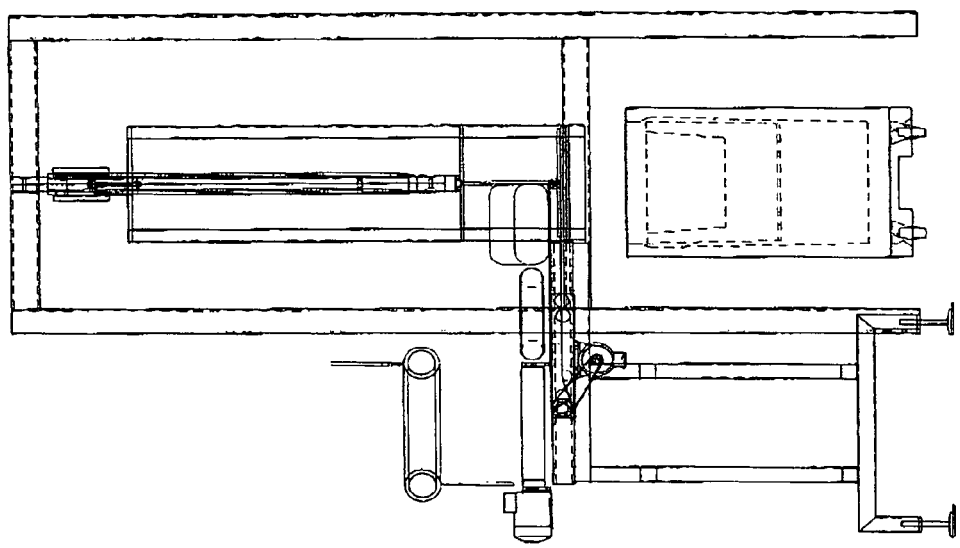
Figure 6D:
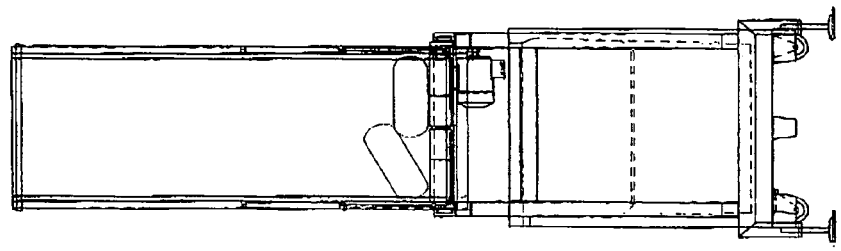
Figure 5E:
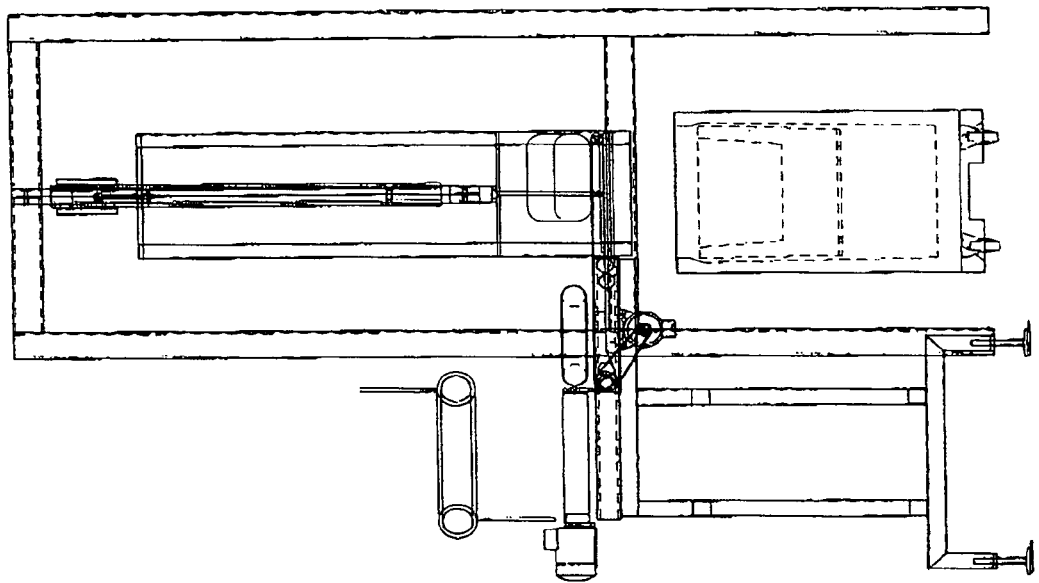
Figure 6E:
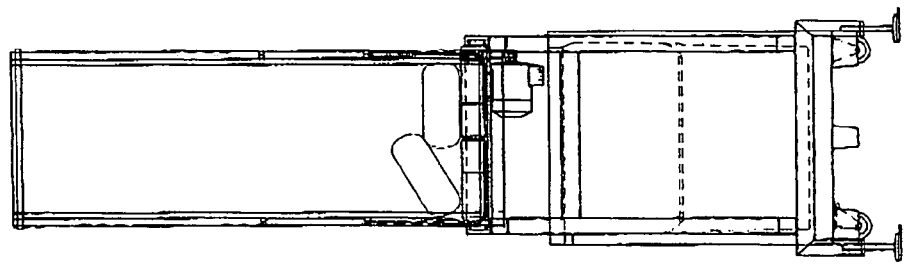
Figure 5F:
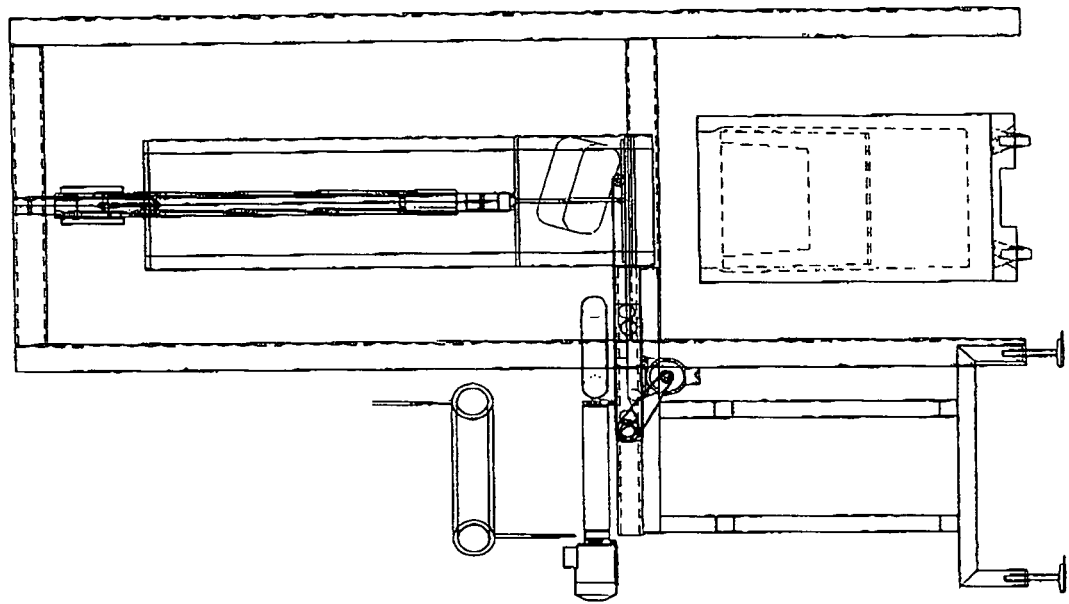
Figure 5G:
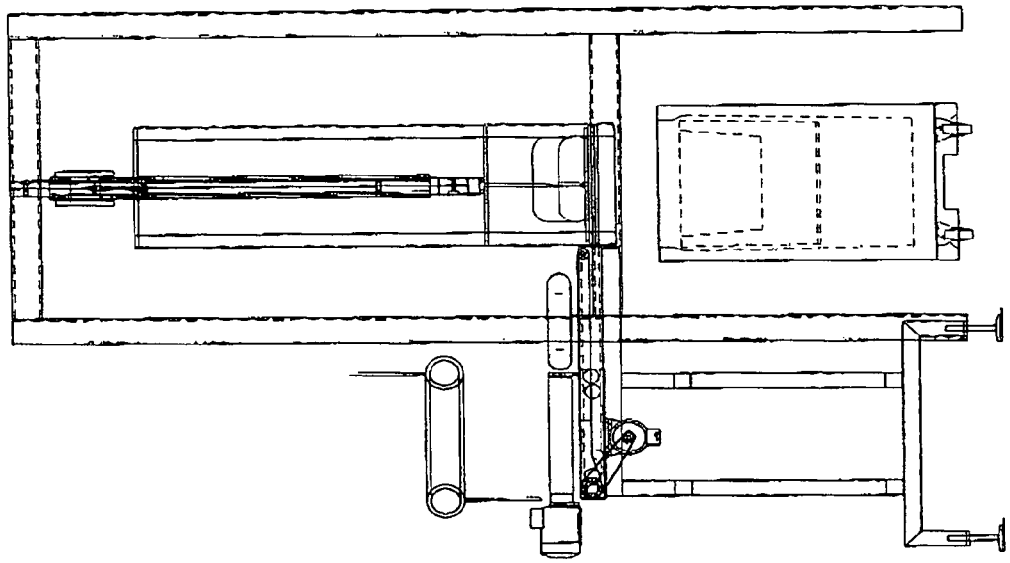
Figure 6G:
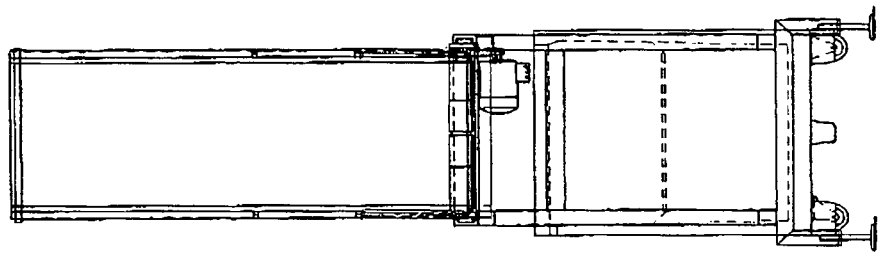
Figure 5I:
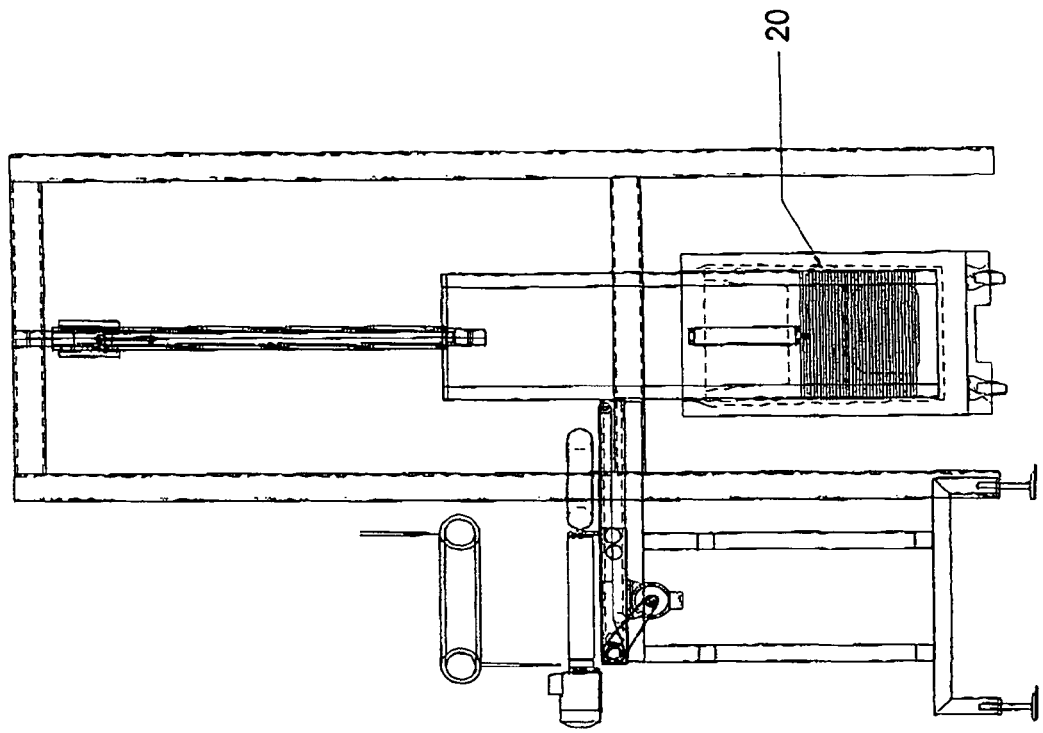
Figure 5H:
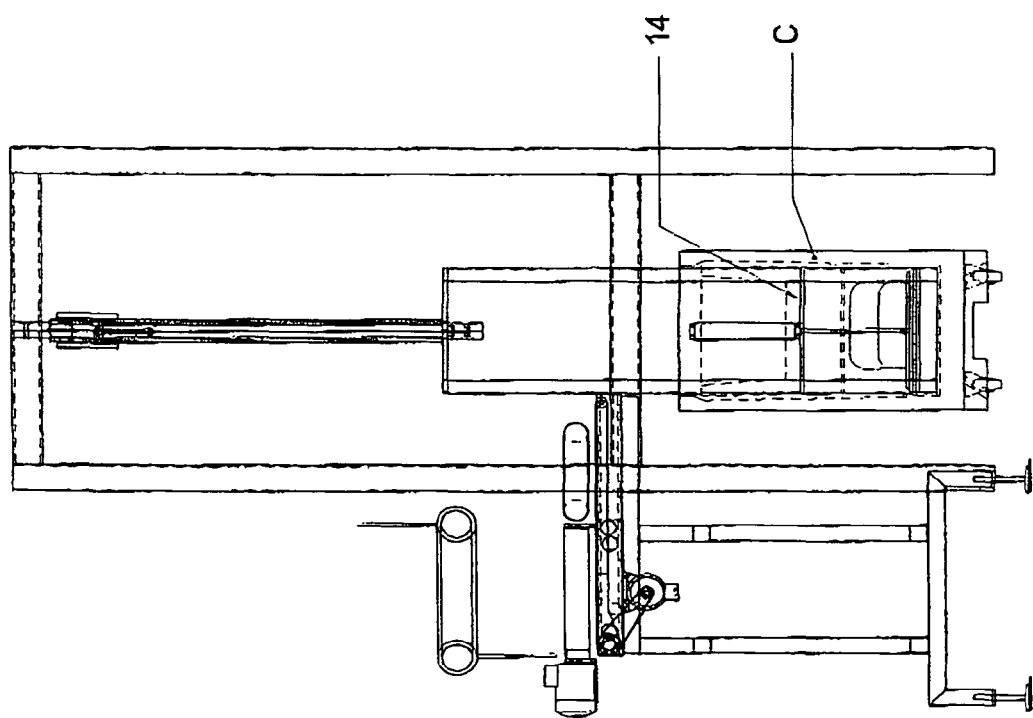
Figure 5J:
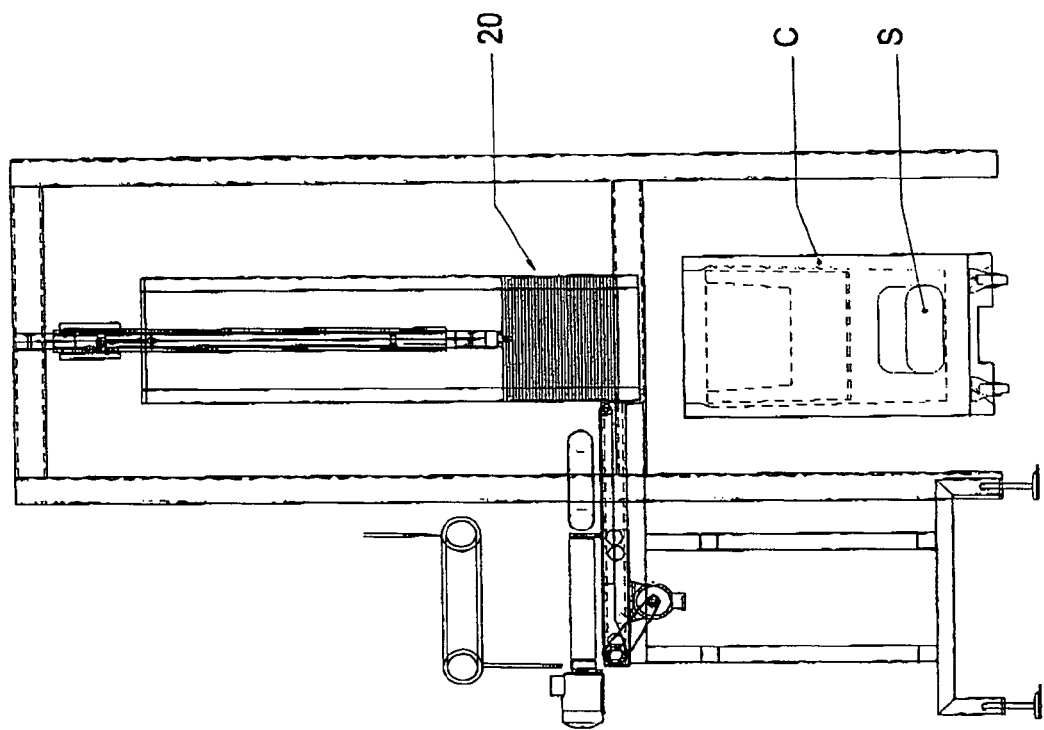
Figure 8:
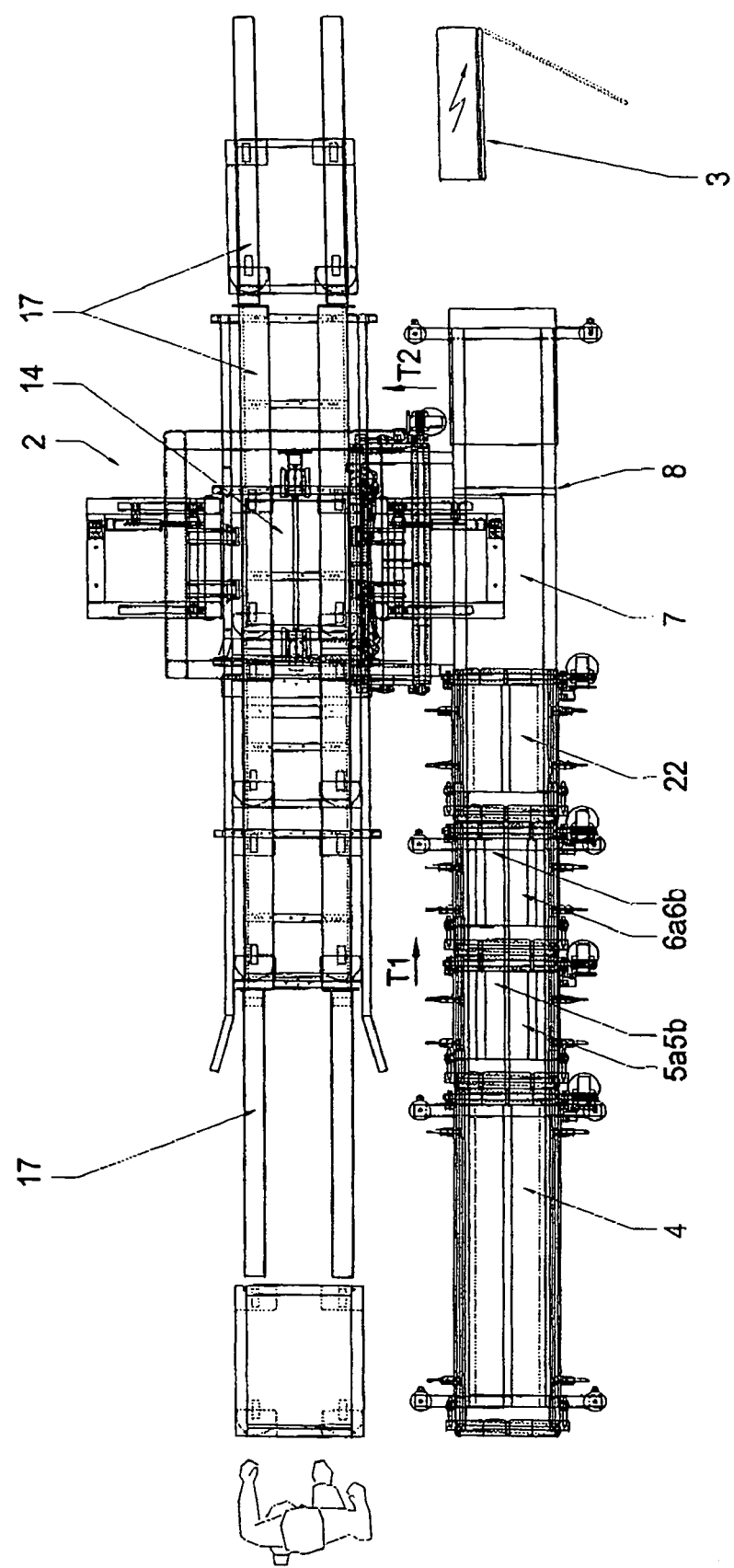
FIG. 8 shows a similar view to that shown in FIG. 2 of the second exemplary embodiment shown in FIG. 7.
Figure 9:
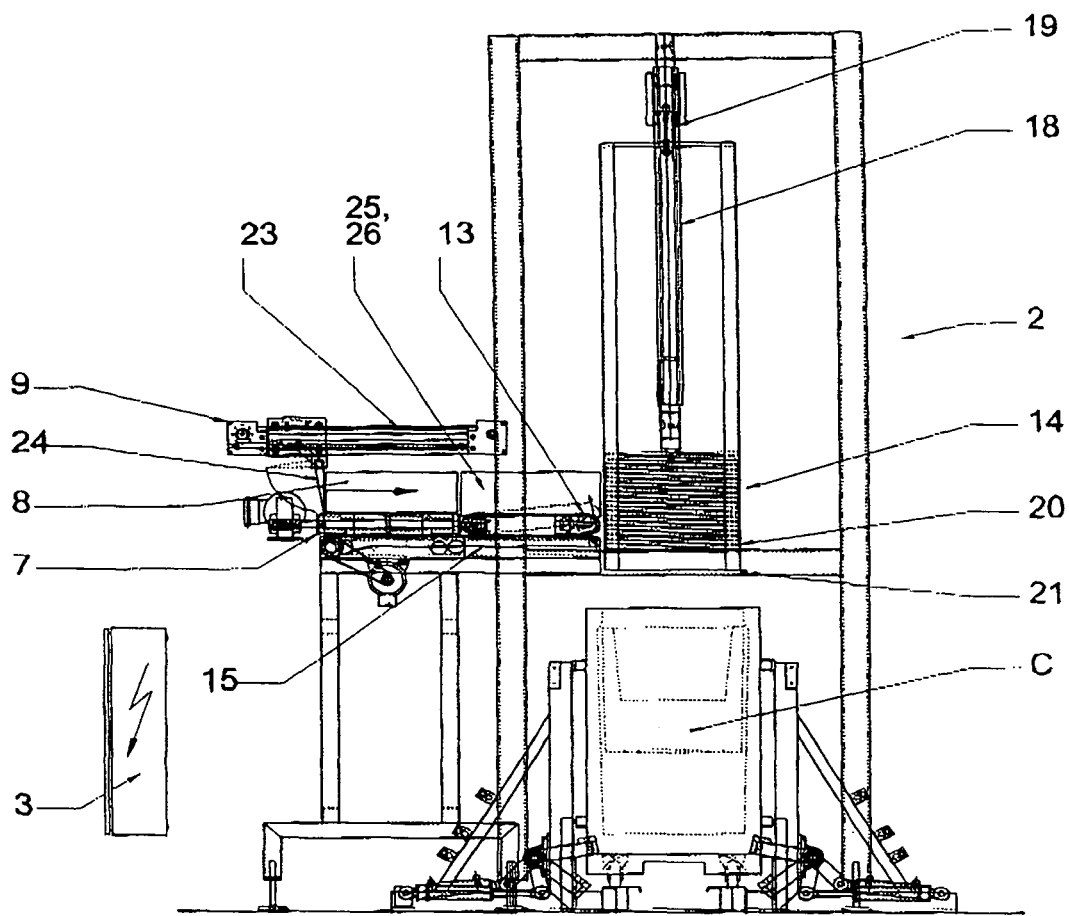
FIG. 9 shows a similar view to that shown in FIG. 3 of the second exemplary embodiment shown in FIG. 7.

The operation of the apparatus shown in FIGS. 1-4 will hereinafter be described with reference to FIGS. 5a-5i and the corresponding left side elevational views shown in FIGS. 6a-6e and 6g. From the feed conveyor assembly 1, two bags S are conveyed up to the stop 8. The bags S are on the second belt conveyor 7 and, as is clearly visible in FIG. 5a, they are ready to be pushed onto the collecting belt 13 by means of the transfer device 9. In FIG. 5a, it is clearly visible that the flexible curtain 20 is in a different position from the one shown in FIG. 3. In FIG. 5a, the flexible curtain 20 extends in horizontal direction and forms the bottom of the holder 14. In FIGS. 5b, 6b, the bags S have been pushed onto the collecting belt 13 by means of the transfer device 9. In FIGS. 5c, 6c, the retracting belt 15 has partly been moved into the holder 14 while, at the same time, the collecting belt 13 is driven in order to discharge the bags S therefrom and to place them onto retracting belt 15. In FIGS. 5d, 6d, the bags S are wholly on the retracting belt 15. The retracting belt 15 then moves still further in horizontal direction into the holder 14, which is shown in FIGS. 5e, 6e. After this, the retracting belt 15 moves out of the holder 14 while the conveyor belt of the retracting belt 15 is driven, so that the bags S are discharged from the retracting belt 15 and end up on the bottom of the holder 14, which is shown in FIGS. 5f and 5g. FIG. 5h shows that the holder 14 has been moved downward to near the bottom of the container C. In FIG. 5a, it is also visible that the flexible curtain still extends in horizontal direction, so that the bags S rest thereon. In FIG. 5i, the flexible curtain 20 has been pulled away from the bottom and now extends in vertical direction. The bags S now rest on the bottom of the container C. When the flexible curtain is pulled away from the bottom, the bags need cover hardly any drop height. This is because, by means of the sensor 21, the holder 14 has been moved against or near the container bottom or an upper layer of bags S present therein. After discharging the bags S, the holder 14 can be moved upward again, which is shown in FIG. 5j. The cycle described hereinabove can now be repeated to place a next layer of bags in a container C.

The advantage of the separate collecting belt 13 is that the formation of a new layer can already start while the preceding layer is being placed in the holder 14 by the retracting belt 15 and while the holder 14 is placing the preceding layer in the container C. In this manner, the formation of a following layer and the further processing of an already formed preceding layer take place simultaneously, which is favorable for the processing capacity of the apparatus.

It is noted that, by means of the successive rotating systems 5, 6, the bags can be rotated through 90 degrees if desired. On the first rotating system 5, a respective bag is rotated through 45 degrees, while, on the second rotating system 6, a bag already rotated through an eighth turn can again be rotated through 45 degrees. Because two rotating systems 5, 6 are present, a following bag can already be subjected to a rotation or, conversely, not be subjected to a rotation, while the preceding bag is still being rotated on the second rotating system 6. The presence of the two rotating systems 5,6 thus makes it possible to convey the bags at a smaller distance from one another, which also improves the processing capacity of the apparatus.

FIGS. 7-16 relate to a second exemplary embodiment. Corresponding parts are designated by the same reference numerals as in the first exemplary embodiment. The second exemplary embodiment differs from the first exemplary embodiment in the following matters.

A first difference is that, in the part of the feed conveyor assembly extending in the first conveying direction T1, an extra belt conveyor 22 is arranged which is arranged so as to be movable up and down by a feed end. As is diagrammatically shown in FIG. 10, by means of this belt conveyor 22, successive bags can be laid over one another in an overlapping manner, which has a favorable influence on the fill factor of the container C.

A second difference is formed by the design of the transfer device 9. In the second exemplary embodiment, this transfer device is formed by a piston cylinder assembly 23 to which a folding pusher plate 24 has been attached.

A third difference is that the collecting belt 13, and particularly its discharge end, is arranged so as to be movable up and down, which is clearly visible in FIG. 9 and FIGS. 15a-15c. The purpose of this is to enable the bags S to be stacked in an overlapping manner in the second conveying direction T2 as well, so that a still better fill factor of a container C is obtained. FIGS. 15a-15c clearly show how the overlapping stacking is obtained.

A fourth, very important difference is formed by the presence of two folding side plates 25, 26 arranged on both sides of the collecting belt 13. These side plates 25, 26 are clearly visible in FIGS. 9, 11a-11d, 12a-12d and 14a-14b. By means of these side plates 25, 26, the bags S present on the collecting belt can be laterally compressed, so that they get a shape which is shown in FIG. 14b. As a result of this compression, the bags can be introduced into the holder 14 of the loading unit 2 without any problems, which is visible in FIG. 15a. This is because the mutual distance between the folding side plates 25, 26 will substantially correspond to the transverse dimension of the holder 14. FIGS. 11a-11d and 12a-d, respectively, clearly show at which moment the side plates 25,26 are in the folded-down, horizontal position (FIGS. 11a and 12a) and in the folded-up, substantially vertical position (FIGS. 11b-11d and 12b-12d).

FIG. 13 shows a left side elevational view of FIG. 11a. The stop 8, which is clearly visible in FIG. 13, can be adjusted in horizontal direction, so that the position of the bags with respect to the holder 14 can be accurately determined.

Finally, FIGS. 16a-d show clearly how the holder 14 and flexible curtains 20 thereof are moved to discharge the bags S virtually without drop height into a container C. The different positions of the holder 14 and the flexible curtains 20 in a number of loading positions are clearly shown in this series of Figures.

It is clear that the invention is not limited to the exemplary embodiments described but that various modifications are possible within the scope of the invention as defined by the claims.

The invention claimed is:

1. An apparatus for loading at least one of a plurality of bags and a plurality of netting packages into a container, wherein the apparatus comprises:
   a feed conveyor assembly;
   a loading unit including:
      a holder that is movable up and down, the holder being sized to receive and to hold at least one of the plurality of bags and the plurality of netting packages and to be substantially fittingly receivable in the container,
      at least one pressure-controlled air cylinder that is movable up and down and structured and arranged to carry substantially all of the weight of the holder and at least one of the plurality of bags and the plurality of netting packages disposed in said holder when lowering said holder into said container, and
      a drive unit having elements that are movable up and down, the drive unit structured and arranged:
         to control a vertical position of said holder,
         to carry a portion of the weight of the holder and said at least one of the plurality of bags and the plurality of netting packages when lowering said holder and said at least one of the plurality of bags and the plurality of netting packages into said container,
         to carry all of the weight of said holder when raising said holder from inside said container, and
         to determine, when lowering said holder into said container, when a portion of the weight of said holder and said at least one of the plurality of bags and the plurality of netting packages has been transferred to the container or to an object in the container by sensing a weight change; and
   control means for forming a layer of bags in the loading unit, the layer having dimensions substantially corresponding to at least one bottom dimension of the container to be loaded, wherein the control means is adapted to control the loading unit to place the layer by moving the holder down by activating the at least one pressure-controlled air cylinder and the drive unit when lowering the holder into said container to be loaded and by activating the drive unit when removing the holder.

2. An apparatus according to claim 1, wherein the feed conveyor assembly comprises a first rotating system and a second rotating system arranged one behind the other, wherein each of the first rotating system and the second rotating system comprises two parallel running conveyor belts which are drivable at different speeds in order to rotate the bags in a plane parallel to said running conveyor belts.

3. An apparatus according to claim 2, wherein the control means rotates a bag through a first angle of 45 degrees with respect to an orientation of the bag in the layer on the first rotating system and to rotate it through an additional angle of 45 degrees with respect to the first angle of 45 degrees on the second rotating system, wherein the control means further provides the first rotating system, during a processing of a preceding bag on the second rotating system, with signals for handling a following bag on the first rotating system.

4. An apparatus according to claim 1, wherein the feed conveyor assembly further includes a plurality of conveyors arranged so as to be movable up and down by at least one end, so that successive bags can be stacked in an overlapping manner.

5. An apparatus according to claim 4, wherein:
the feed conveyor assembly is provided with a stop against which the bags butt after the bags have been conveyed over the feed conveyor assembly in a first direction, wherein, viewed in a first conveying direction, upstream of the stop, the apparatus includes a transfer device capable of placing the bags accumulated against the stop onto a further conveying path of the feed conveyor assembly, wherein the said further conveying path has a second conveying direction extending substantially perpendicular to the first conveying direction;
the further conveying path comprises a collecting belt and a retracting belt, wherein the retracting belt is movable in the second conveying direction, such that a discharge end thereof can be introduced into the loading unit; and
at each of the first feed end and the first discharge end of the collecting belt, a side plate is included, the side plate being pivotable from a horizontal position with respect to the collecting belt into a vertical position with respect to the collecting belt.

6. An apparatus according to claim 5, wherein:
the holder is provided with an open side via which the holder is loadable from the further conveying path, wherein a bottom of the holder is formed by a flexible curtain which can be pulled away from the bottom;
the flexible curtain comprises two curtain parts which are movable from a closed position from a middle of the bottom of the holder away from each other for removing the bottom of the holder, such that a layer of bags can be released from the middle of the bottom of holder; and
below the loading unit, a conveying system for containers extends.

7. An apparatus according to claim 1, wherein the feed conveyor assembly is provided with a stop against which the bags butt after the bags have been conveyed over the feed conveyor assembly in a first conveying direction, wherein, viewed in the first conveying direction, upstream of the stop, the apparatus includes a transfer device capable of placing the bags accumulated against the stop onto a further conveying path of the feed conveyor assembly, wherein the said further conveying path has a second conveying direction extending substantially perpendicular to the first conveying direction.

8. An apparatus according to claim 7, wherein the further conveying path comprises a collecting belt, having a first feed end and a first discharge end, and a retracting belt, wherein the retracting belt is movable in the second conveying direction, such that a discharge end thereof can be introduced into the loading unit.

9. An apparatus according to claim 8, wherein, at each of the first feed end and the first discharge end of the collecting belt, a side plate is included, the side plate being pivotable from a horizontal position with respect to the collecting belt into a vertical position with respect to the collecting belt.

10. An apparatus according to claim 9, wherein a discharge end of the collecting belt is arranged so as to be movable up and down, so that the bags can be stacked in an overlapping manner in the second conveying direction as well.

11. An apparatus according to claim 10, wherein:
the holder is provided with an open side via which the holder is loadable from the further conveying path, wherein a bottom of the holder is formed by a flexible curtain which can be pulled away from the bottom;
the flexible curtain comprises two curtain parts which are movable from a closed position from a middle of the bottom of the holder away from each other for removing the bottom of the holder, such that a layer of bags can be released from the middle of the bottom of holder; and
below the loading unit, a conveying system for containers extends.

12. An apparatus according to claim 8, wherein a discharge end of the collecting belt is arranged so as to be movable up and down, so that the bags can be stacked in an overlapping manner in the second conveying direction as well.

13. An apparatus according to claim 1, wherein the holder is provided with an open side via which the holder is loadable from a further conveying path, wherein a bottom of the holder is formed by a flexible curtain which can be pulled away from the bottom.

14. An apparatus according to claim 13, wherein the flexible curtain comprises two curtain parts which are movable from a closed position from a middle of the bottom of the holder away from each other for removing the bottom of the holder, such that a layer of bags can be released from the middle of the bottom of holder.

15. An apparatus according to claim 1 further comprising at least one sensor for determining a distance between a bottom of the holder and a bottom of the container, wherein the at least one sensor is a mechanical sensor.

16. An apparatus according to claim 1, wherein, below the loading unit, a conveying system for containers extends.

* * * * *